(12) United States Patent
Douglas et al.

(10) Patent No.: US 8,217,596 B1
(45) Date of Patent: Jul. 10, 2012

(54) METHOD OF CONTROLLING COHERENT SYNCHROTON RADIATION-DRIVEN DEGRADATION OF BEAM QUALITY DURING BUNCH LENGTH COMPRESSION

(75) Inventors: David R. Douglas, Newport News, VA (US); Christopher D. Tennant, Williamsburg, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 705 days.

(21) Appl. No.: 12/381,954

(22) Filed: Mar. 18, 2009

(51) Int. Cl.
*H01J 3/14* (2006.01)
(52) U.S. Cl. .................... 315/503; 250/492.3
(58) Field of Classification Search .......... 315/503, 315/500, 506, 502, 504; 250/492.1, 492.3; 378/119
See application file for complete search history.

(56) References Cited

U.S. PATENT DOCUMENTS

2007/0014392 A1* 1/2007 Madey et al. ............. 378/119
2008/0290297 A1* 11/2008 Blasche et al. ........... 250/492.3

* cited by examiner

*Primary Examiner* — David Hung Vu

(57) ABSTRACT

A method of avoiding CSR induced beam quality defects in free electron laser operation by a) controlling the rate of compression and b) using a novel means of integrating the compression with the remainder of the transport system: both are accomplished by means of dispersion modulation. A large dispersion is created in the penultimate dipole magnet of the compression region leading to rapid compression; this large dispersion is demagnified and dispersion suppression performed in a final small dipole. As a result, the bunch is short for only a small angular extent of the transport, and the resulting CSR excitation is small.

9 Claims, 6 Drawing Sheets

METHOD OF CONTROLLING COHERENT SYNCHROTON RADIATION-DRIVEN DEGRADATION OF BEAM QUALITY DURING BUNCH LENGTH COMPRESSION

The United States of America may have certain rights to this invention under Management and Operating Contract DE-ACO5-060R23177 from the United States Department of Energy.

FIELD OF THE INVENTION

The present invention relates to free electron laser beam quality and more particularly to methods of controlling coherent synchrotron radiation-driven degradation of beam quality during bunch length compression in the operation of such devices.

BACKGROUND OF THE INVENTION

Coherent synchrotron radiation (CSR) drives potentially severe degradation of beam quality when compressing a bunched electron beam. Prior art methods of bunching have been unable to avoid this problem, as all prior methods involve compressing the bunch slowly and/or traversing a large angle dipole with a short bunch. Degradation of beam quality due to these effects limits the performance of all existing designs for energy recovery linac (ERL) drivers of free electron lasers (FELs) at single bunch charges much in excess of 100 pC. Thus, driver transport system designs in which the beam undergoes either parasitic compressions or transport at short bunch lengths through large bend angles are incapable of maintaining beam quality adequate for lasing with high efficiency or at high power.

Thus, there is a need for a method of controlling coherent synchrotron radiation degradation of beam quality when a bunched electron beam is compressed in a free electron laser operation.

OBJECT OF THE INVENTION

It is therefore an object of the present invention to provide a method controlling coherent synchrotron radiation degradation of beam quality when a bunched electron beam is compressed in a free electron laser operation.

SUMMARY OF THE INVENTION

According to the present invention there is provided a method of avoiding this effect by a) controlling the rate of compression and b) using a novel means of integrating the compression with the remainder of the transport system: both are accomplished by means of dispersion modulation. A large dispersion is created in the penultimate dipole magnet of the compression region, leading to rapid compression; this large dispersion is demagnified and dispersion suppression performed in a final small dipole. As a result, the bunch is short for only a small angular extent of the transport, and the resulting CSR excitation is small.

DETAILED DESCRIPTION

Figure 1:
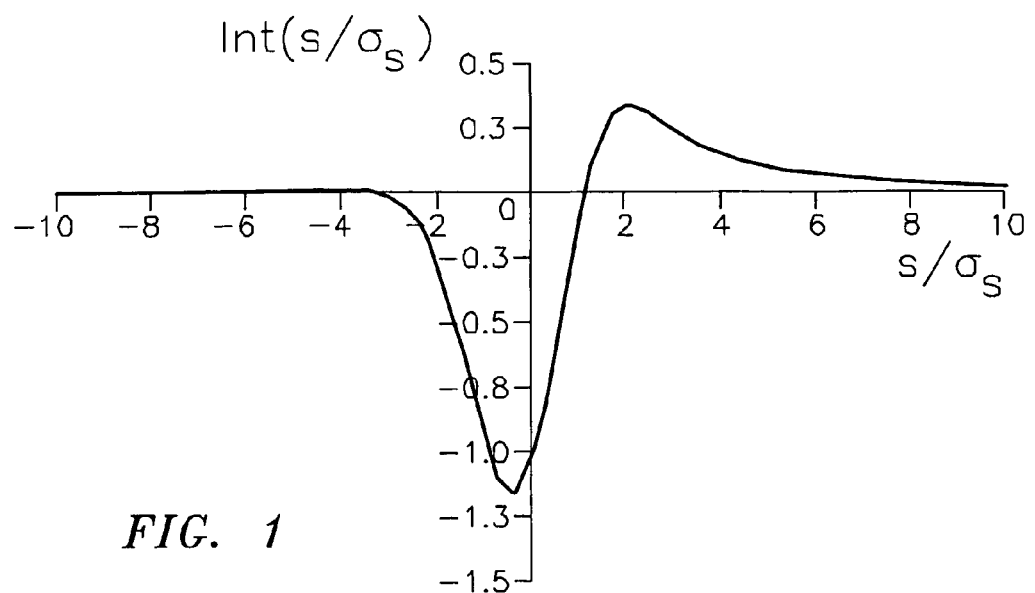
FIG. 1 depicts a Wakefield integral as a function of longitudinal offset.

In this description, we assume a simple CSR model that has been detailed elsewhere (D. Douglas, "Suppression and Enhancement of CSR-Driven Emittance Degradation in the IR-FEL Driver", JLAB-TN-98-012, 24 Mar. 1998). This description captures the fact that CSR causes a redistribution of energy in a bunch during bending, and as a consequence can significantly degrade emittance. In a bunch of length $\sigma_z$, charge/bunch Q, and energy E, an electron at position s will experience, while undergoing a bend of through angle $\Delta\theta$ at radius $\rho$, the following impulse in relative momentum $\delta p/p$ given according to the wake function $\mathrm{Int}(s/\sigma_z)$ as shown in FIG. 1 and defined by the following formula.

$$\frac{\delta p}{p} = \left\{ \frac{18000 Q \rho^{1/3} \Delta\theta}{3^{1/3}\sqrt{2\pi}\,\sigma_s^{4/3} E} \right\} \mathrm{Int}\!\left(\frac{s}{\sigma_s}\right)$$

This interaction has two consequences:
1) energy is redistributed across the bunch, lowering the energy of the tail and raising that of the head and shifting the centroid due to radiative loss; and
2) when the electron is suddenly displaced in energy, it is no longer on the "correct" orbit: it thus begins betatron oscillating about the (dispersed) orbit appropriate to its new energy.

The accumulation of all such offsets for all electrons in the bunch leads to emittance degradation.

The effect of the essentially impulsive perturbation due to a single interaction is similar to that of the "head-tail" deflection from RF power couplers as described by D. Douglas, "Kick Error Sources and Emittance Dilution", CEBAF-TN-86-034, 25 Aug. 1986.

Instead of being more or less linear in particle phase (position along the bunch) it is however convoluted by the wake function and manifests itself in a nonlinear manner on the scale of the bunch length. It therefore will cause significant distortion not only of the transverse phase space, but also of the longitudinal phase space. At "elevated" bunch charges—1 nC or greater—this can result in a phase space that is so seriously degraded that "short" bunches cannot be generated and FEL performance suffers.

For purposes of subsequent discussion, we note that the emittance degradation will scale according to the following function $(\delta p/p)^2$. This is, of course, because the momentum shift translates to positional/angle errors (via the dispersion) and emittance is a quadratic form in these variables. We also note that the emittance growth will scale with the square of the coupling term—the dispersion—as well. More sophisticated descriptions of CSR should in fact see some suppression of CSR due to the transverse spatial extent of the bunch. A very large dispersion value will cause the transverse size of the beam to exceed the communication length amongst the various electrons (individual electrons lie outside of each other's light cones) so that the effective charge will decrease. As a result, there may be multiple optima for beamline designs. A hypothetical system with vanishingly small dispersion would not experience any emittance degradation, as there is no coupling of the momentum kick to transverse position/angle. This is true of the transverse only. Longitudinally, there would be redistribution of the momentum, potentially degrading the emittance. However, in the zero-dispersion limit, there would be no reaction in phase/path length due to lack of coupling (zero dispersion). A system with infinite dispersion would similarly not experience degradation as the entire bunch is out of communication with itself. For finite dispersions, large dispersion is undesirable, because it drives worse degradation, but is also good, because it reduces the interaction. Multiple "ideal" solutions are therefore likely possible.

From a study of the driving term (reproduced below), it is seen that options to control this effect are rather limited in any practical transport system.

$$\frac{\delta p}{p} = \left\{ \frac{18000Q\rho^{1/3}\Delta\theta}{3^{1/3}\sqrt{2\pi}\,\sigma_s^{4/3}E} \right\} \text{Int}\left(\frac{s}{\sigma_s}\right)$$

The wake function is a function of the system. The energy, charge and bunch length are defined by the FEL designer. The dependence on radius is weak, and in a rational system will be limited to values of a foot or a bit more, because: a) one foot is a convenient length; and b) to get below a foot at 100 MeV, a more than 10 kG, high field, large angle and small radius magnet with good field quality, which is not trivial to build, is required.

Thus, the only variable that can be adjusted is angle. This does not provide much of a controller, since one has to recirculate, and compress, one has to bend at least 180°. Most designs use either the final (large angle bend) of a recirculation arc or the final dipole(s) of a chicane to perform such compression. In the former case, the bunch is short throughout the final (large angle) bend, which dooms the beam to severe degradation. In the latter case, the chicane is often small—with millimeters of $M_{56}$—so as to limit the angle over which the bunch is short. However, the compression proceeds slowly and is fairly weak (small $M_{56}$), meaning that the bunch has been made fairly short before entering the chicane—usually by the action of a large final bend in the recirculation. Again, the total bend angle over which the bunch is short is relatively large, leading to severe degradation.

To avoid this problem one must first require that the final bend of a compressor both a) be of a very small angle and b) provide final suppression of any remnant dispersion. This in turn requires that the dispersion into this dipole be very small and have very small angle. It is next required that compression occur abruptly in the penultimate bend of the compressor. That compaction has been previously defined as follows, $$M_{56} = \int \eta d\theta$$

Thus, the transport system dispersion in the penultimate bend must be large so as to provide rapid accumulation of the compaction and thereby achieve the desired rapid compression. Therefore, the transport system must use a final compression wherein the penultimate dipole has large dispersion, and the final dipole bends through a very small angle. This implies that the dipole-to-dipole transport image has a large dispersion to a small dispersive angle—or, in other words, it must provide a more or less parallel-to-point demagnified image. This can be done with a (modulo) quarter-integer alternating gradient focusing system (FODO) array.

Figure 2:
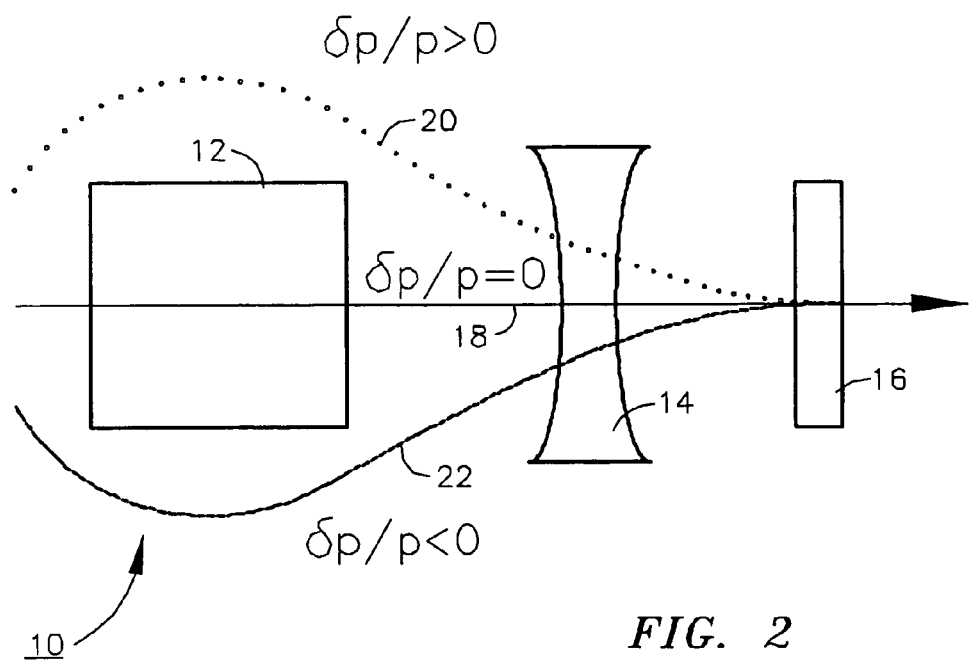
FIG. 2 is a schematic representation of a notional compressor providing control of CSR effects.

In such a system, a long bunch exiting a recirculation arc enters the compressor, and is abruptly compressed in the penultimate dipole (and would thus be short for only a small angular interval at the end of this dipole). The large dispersion can, in principle, aggravate emittance dilution, but can also, in principle, alleviate CSR effects by providing transverse decoherence. The final dispersion suppression process is then driven by the quad matching to the final small dipole; as this bend is small angle it too provides little emittance degradation. An example of such a system is shown in FIG. 2 wherein the control system 10 comprises: a large next-to-last final dipole 12 that provides rapid compression of bunch length; and a quadrupole lens 14 that matches off-momentum orbits to final dipole 16.

A design for a CSR-managed transport system must address a number of requirements. Firstly, it must support a reasonable longitudinal matching scenario. Secondly, it must provide a reasonable and appropriate physical layout, including recirculation and transport to a wiggler in an acceptably packaged footprint. Thirdly, it must adequately limit aberrations and error sensitivities, and make provision for some correction/control of these terms. Finally, it must address, the problem of final compression of a high charge state bunch in the presence of CSR and longitudinal space charge (LSC).

Experience demonstrates that longitudinal space charge (LSC) is an issue of concern at bunch charges on the order of 100 pC; and is therefore be of far greater importance at bunch charges on the order of 1 nC. Thus, a) the injected bunch must be quite long and of low momentum spread, b) the bunch must be accelerated on the rising portion of the RF waveform, and c) the linac-to-wiggler compaction must be negative so as to provide appropriate compression.

The above discussion provides a solution for the final compression of the bunch. There are at least three additional means of (further) controlling CSR degradation of emittance in transport systems. The first is to perform some type of emittance compensation, wherein CSR effects in a later portion of the transport are used to offset CSR effects induced early on. This was discussed in D. Douglas, "Suppression and Enhancement of CSR-Driven Emittance Degradation in the IR-FEL Driver", JLAB-TN-98-012, 24 Mar. 1998 and is, in principle, possible. However, as it relies on generating an appropriate conspiracy along the transport line so as to provide the desired compensation. Additionally, it can be space and component intensive and therefore is not well-suited for use in a compact system. A second, similar, approach is to impose on the beam, either before or after the CSR effect, compensatory lattice aberrations. This can be used to good effect, for example, to compensate wake-function-induced longitudinal distortion by adjustment of the lattice $T_{566}$.

A final means of CSR management entails the use of very strong focusing. This will reduce the lattice response to CSR-induced errors and thus alleviates degradation. However, focusing strong enough to be of good effect in this context will also be very chromatic, error sensitive, and will require high magnetic fields (potentially difficult to engineer and fabricate with adequate field quality).

Proper management of the compaction as a function of distance along the beamline must be provided so as to ensure both transverse and longitudinal emittance not be excessively degraded. In particular, it has been noted that peak currents of 400 A are associated with significant (though nonfatal) CSR effects. Simulation by D. Douglas and C. Tennant, "Simulation of CSR Effects in the FSU BigLight Driver Accelerator" (unpublished) suggest that these are due not only to both parasitic compressions in the Bates arcs but also to the final compression and LSC effects during transport of the short bunch through the FEL interaction region of the apparatus. Further, simulations of CSR effects at the nC level indicate that a compressor using either unmanaged parasitic compressions or a large-angle final dipole will fatally degrade both the transverse and longitudinal emittances.

Therefore an architecture in which the initial recirculation transport provides a large debunching compaction, followed by a compression region of the type described above, wherein compression is supplied very rapidly using a large dispersion in a finite angle penultimate bend, with this large dispersion trimmed out by a demagnifying parallel-to-point modulation in quads and the use of a small angle final trim dipole has been selected. In the context of the stated longitudinal matching scenario, a design with a monotonically increasing (positive) compaction recirculation arc, followed by a separate compression line with monotonically decreasing negative compaction is desired. This will avoid parasitic compressions and allow use of rapid compression as described above.

A number of specific designs meet the foregoing requirements. The first of these is shown in FIG. 2 wherein the control system 10 comprises: a large next-to-last final dipole 12 that provides rapid compression of bunch length; and a quadrupole lens 14 that matches off-momentum orbits to final dipole 16. A reference, on momentum electron trajectory 18, a trajectory for an electron with higher than normal energy 20 and a trajectory for an electron with lower than normal energy 22 are also depicted in this Figure. Using this design, it is possible to compress a long 1.35 nC bunch to ~½ psec rms to provide a peak current of ~1 kA without excessive degradation of beam quality.

Other designs provide considerable additional guidance on the incorporation of this type of final compression within a practical recirculator. These designs generically incorporate:
 a 180° recirculation arc based on FODO cells
 a compressor system
 a final dispersion suppressor/compressor employing dispersion imaging into a small final trim dipole.

Recirculation arc requirements, positive compaction with low aberrations, are well-met by using a FODO dipole transport in a "second-order achromatic" configuration. Both four- and six-period achromats have been investigated; It was found that the six-period (six 60° cells) configuration was preferable inasmuch as it provided more independent available sextupole channels for aberration control. The resulting arcs therefore comprise six quads and six dipoles. The evolution of the compaction appears to be best managed by using horizontally focusing quads and using parallel-faced dipoles for vertical focusing. As the horizontal focusing is then external to the dipoles, this yields smaller dispersion in the bends and correspondingly smaller positive momentum compaction (of order 1 to 2 m). Use of the opposite polarity (vertically focusing quads and sector dipoles providing horizontal focusing) leads to quite large compaction values, which become relatively difficult to compensate in a well-behaved final compression of the type under consideration here. We precede the arc with a quad telescope to match the linac to the periodic FODO acceptance, and follow the arc by the compressor, the dispersion imaging system/dispersion suppressor, with a subsequent telescope provided for final matching from the dispersion suppressor to the wiggler.

The compressor can, in principle, be a single large angle with appropriate downstream dispersion management, as shown in FIG. 2. Our initial designs in fact used such an approach. Elimination of the final FODO arc bend (thereby providing via the "missing magnet" a large dispersive source angle) allows dispersion to cross over to negative values and become rather large. When modulated to the appropriate (negative) amplitude and passed through a final large angle bend, it then provides the (large negative) compaction required for compression. The parallel-to-point final dispersion management is then invoked. This is generally too violent an approach (it results in severe betatron mismatch) and a more distributed compression is required to provide adequate beam envelope control and aberration control.

More gentle control is provided by using a modularized system comprising a) a FODO arc, b) a compressor based on a "staircase" dispersion suppressor and c) a (modulo) ¼-integer dispersion imaging system. In the system described below, a full, six period 60° FODO arc, each period of which consists of a horizontally focusing quad and a vertically focusing parallel faced dipole was used. As noted above, this provides a reasonable momentum compaction and ample opportunity for aberration control. The quad strength and cell length are adjusted to provide the desired rational tunes; the magnets can, further, be fabricated with appropriate (and, if needed, controllable) multipole content to adjust aberrations as required to achieve desired machine performance.

The compressor must have good focusing properties, provide large enough negative compaction to offset the arc compaction, and admit, if needed, aberration management. A "staircase" geometry, meets these requirements. Optimization of a staircase-based design reveals that an asymmetric staircase provides more desirable behavior than a symmetric system. Thus, as the electron bunch comes out of the arc, bends inward by 45° and reverse bends by 75° to give a first step at 30° outward from the nominal beamline axis. A quad triplet is used to provide 180° of phase advance and image the dispersion from positive to negative values, appropriate to further compression in the third (forward bending) dipole of the staircase.

Various dispersion suppressors and geometries to resolve the final 30° of bend have been investigated. In the spirit of a true staircase, an initial forward bend of 35°, followed by a ¼-integer quad channel, to match to a final 5° reverse bend was attempted. This design required excessively strong focusing and had pronounced betatron mismatch and poor chromatic properties. A seven-quad channel with nominally ¾-phase advance was then attempted. This provided better betatron properties, but the phase advance will naturally map the initial negative dispersion to a positive angle. This therefore requires the use of a 25° initial forward bend and a 5° forward final trim bend, rather than a reverse final bend. The resulting geometry is thus a rather canted staircase.

Analysis of chromatic aberrations reveals however that this seven-quad system was, in a sense, "too long" and the phase advance per quad "too low" in that it did not provide appropriate destructive interference of the chromatics of the individual quads amongst themselves. With the realization that a full-up integrated treatment of the system was thus needed, a full linac-to-wiggler beamline with quad matching from linac to arc and from dispersion suppressor to wiggler was established. A five-quad %-wavelength dispersion modulation section was used for the final compression. Use of a pair of triplets to match linac to arc and a four-quad telescope matching arc/compressor to wiggler then gave reasonable chromatic behavior across the full transport.

Starting with beam envelopes and parameters appropriate to acceleration of a 10 mm-mrad/200 keV-psec 1.35 nC bunch through a 750 MHz linac 10° ahead of crest, a transport system with compression performed as described above. A pair of triplets provides betatron matching to a six-period FODO arc. The arc "quads" are actually multipole lenses capable of providing field control through sextupole order. The dipoles are assumed to provide, if needed, embedded sextupole and the dipole poles can be contoured to give octupole and decapole corrections if needed.

As describe above, a quasi-staircase compressor provides a large negative compaction, rotating the beam upright in the longitudinal phase space. Dipole angles are chosen to optimize the betatron match and chromatic behavior; spacings are set to give approximately the nominal compactions. The quads in the compressor and dispersion suppression channel are adjusted to fine-tune the compactions and betatron match, and (as with those in the arc) provide sextupole compensation as needed. A four-quad telescope downstream of the final "trim" dipole imposes the betatron match to the wiggler.

Figure 3:
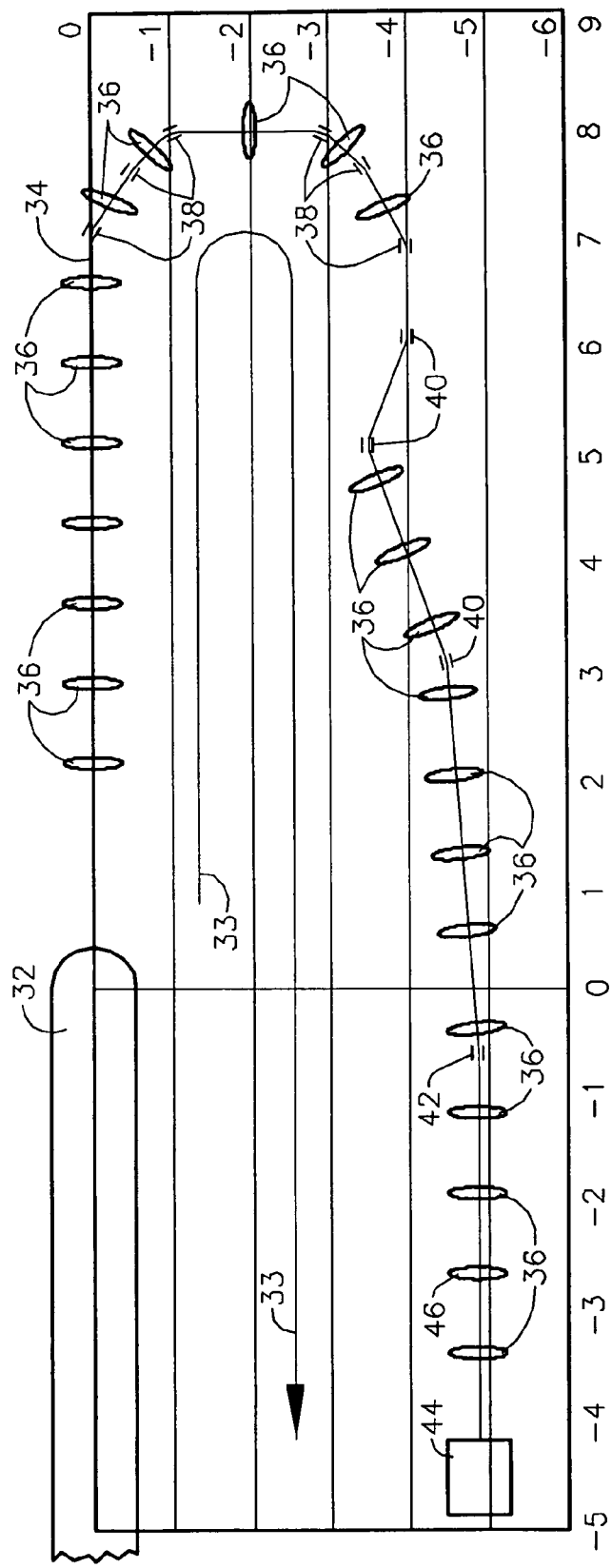
FIG. 3 is a schematic representation of a layout from the cryomodule to the start of the wiggler in accordance with the present invention.
Figure 4:
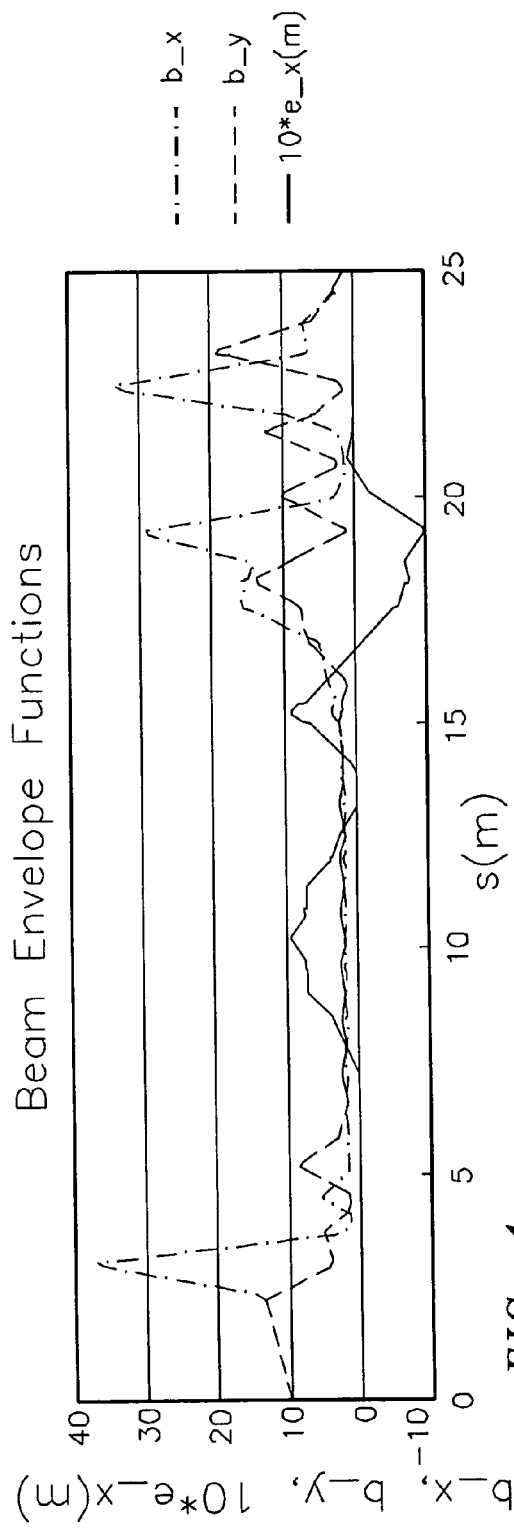
FIG. 4 is a graphic representation of the beam envelope functions from the linac exit to the start of the wiggler.
Figure 5:
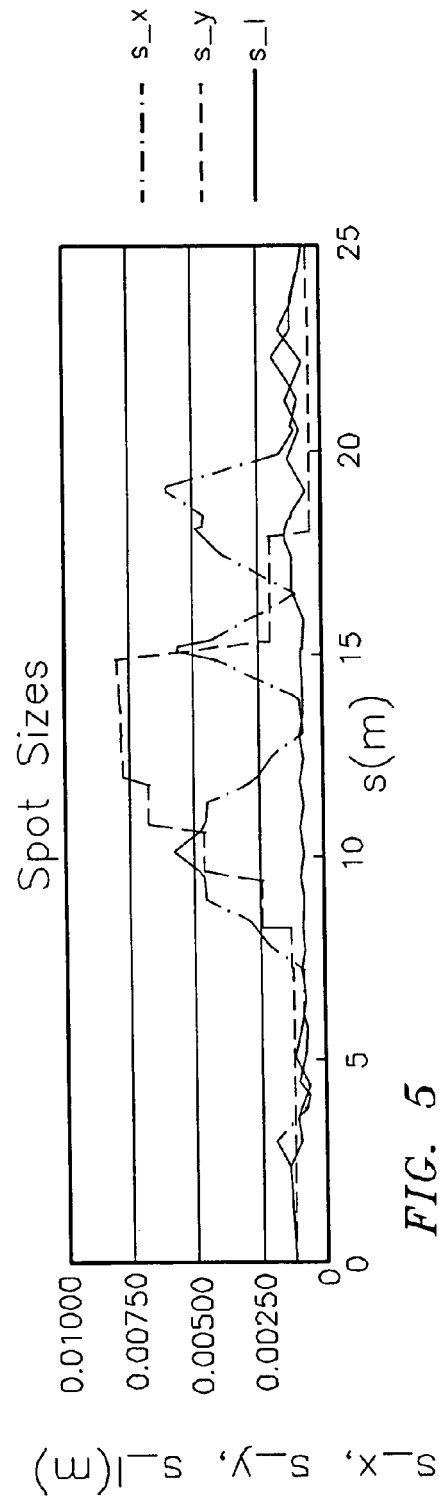
FIG. 5 is a graphic representation of beam spatial sigma values.

A layout of a suitable system 30 is shown in FIG. 3 wherein a beam 34 exits cryomodule 32 and is steered in the direction of arrow 33 by multipole magnets 36 providing transverse focusing and aberration control in combination with arc bending dipoles 38 and compressor dipoles 40 through a final dipole 42 to wiggler 44. The single digit numerals in FIG. 3 represent the dimensions of the system in meters. Beam envelopes are shown in FIG. 4, and beam "spot sizes" (sigma matrix images under the transport) are shown in FIG. 5. As discussed above, the bunch remains long until the end of the penultimate dipole 46, wherein it is compressed quite abruptly.

The layout depicted in FIG. 3 is compact, corresponding to a machine footprint on the of order 25 m by 5 m. The primary element of the width is the alternating gradient focusing system arc or FODO that is well known in the art and comprises a sequence of quadrupole magnets which alternate in field polarity, so that one focuses the beam horizontally (and defocuses it vertically), and the next focuses it vertically and defocuses it horizontally.

As noted, the beam sigmas are quite good, with the bunch compressing appropriately. The beam is very large horizontally through much of the final, compressed transport (up to the final trim dipole).

As with any such transport system, aberration management is a critical matter. We have used three sextupole families embedded in arc quads for the control of $T_{166}$, $T_{266}$, and $T_{566}$. We have added further sextupole order trims to the compressor and dispersion suppressor quads, and embedded sextupole terms in the dipoles, so as to optimize chromatic behavior. Nominally, arc compactions are set to values appropriate to acceleration 10° ahead of crest in a 748.5 MHz linac, that is, an $M_{56}$ of −0.19 m and a $T_{566}$ of −0.76 m.

As the bunch charge is increased, significant phase space distortion results from the onset of CSR. This can be compensated by altering $M_{56}$, $T_{566}$, $W_{5666}$, and $V_{56666}$ using, respectively, trim quads (whilst refitting the betatron match), sextupoles (keeping $T_{166}$ and $T_{266}$ zero and managing all other aberrations), octupoles and decapoles. The latter two have been invoked as pole face contours on the dipoles but can in practice be provided using variable electromagnets. One must attend to the chromatics as this adjustment is done, and as a matter of operational practice will likely need longitudinal tomography.

Figure 6A:
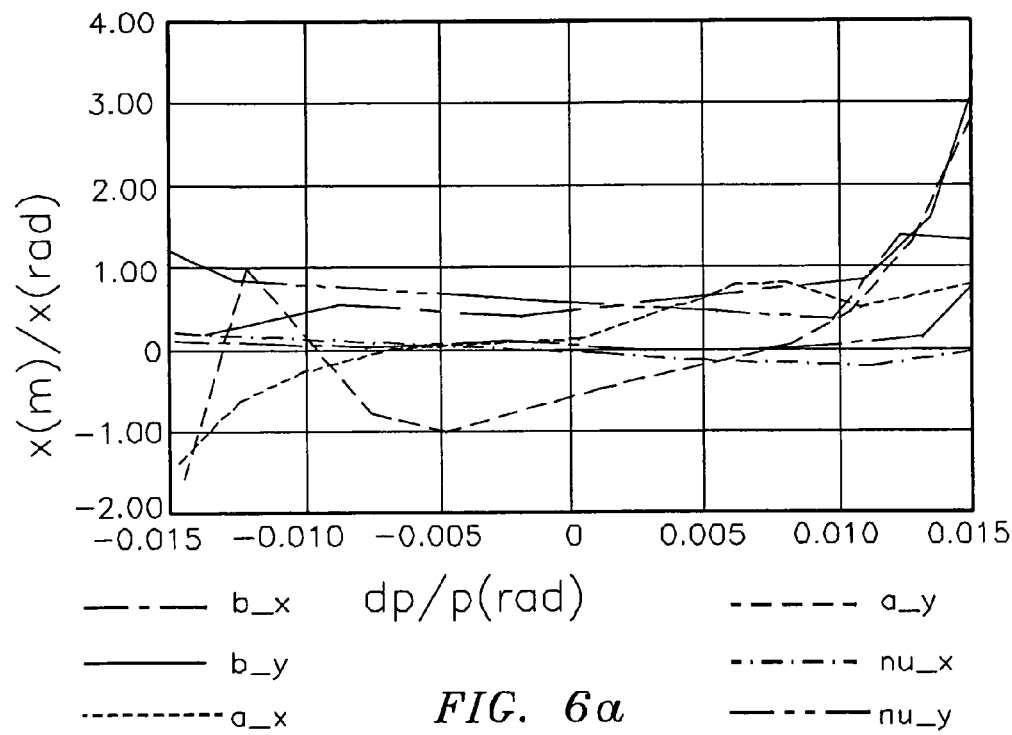
FIGS. 6(*a*) and (*b*) are graphic representations in variations of: lattice functions (a) and orbit (b) with momentum.
Figure 6B:
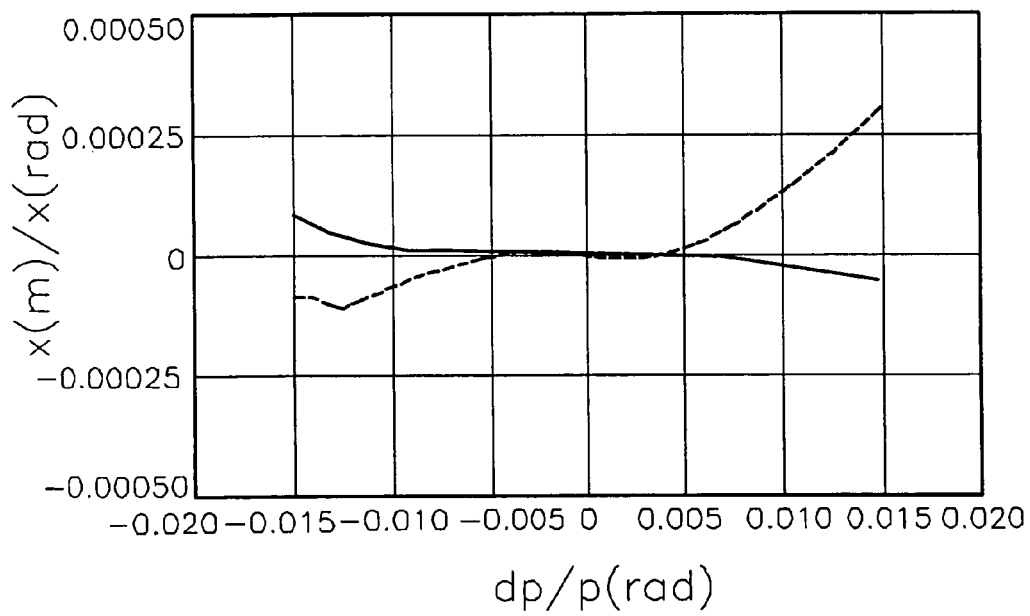
Figure 7A:
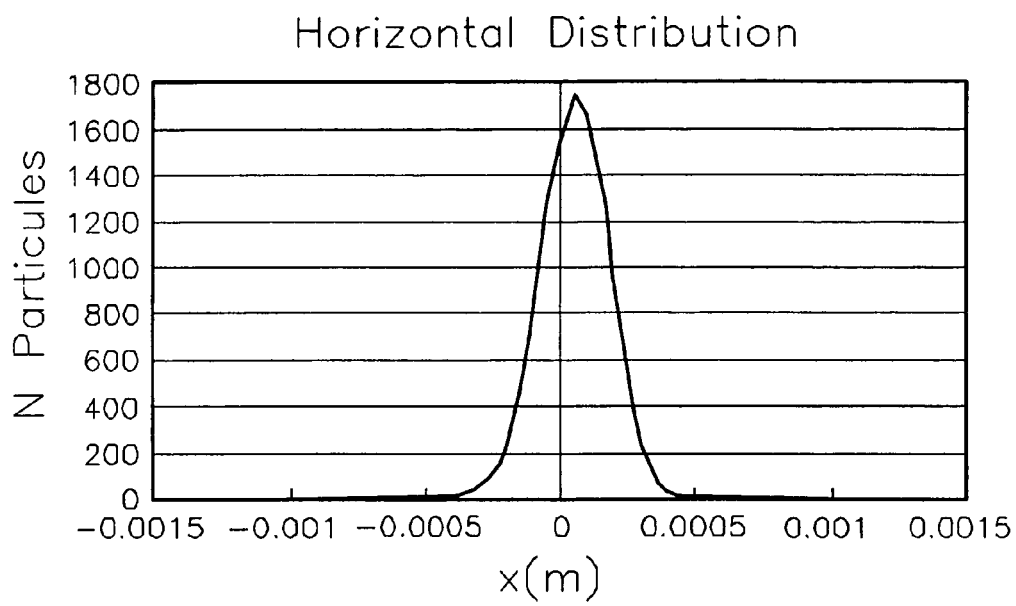
FIGS. 7 (*a-d*) are graphic representations of particles after transport for a linac to a wiggler with CSR effects included.
Figure 7B:
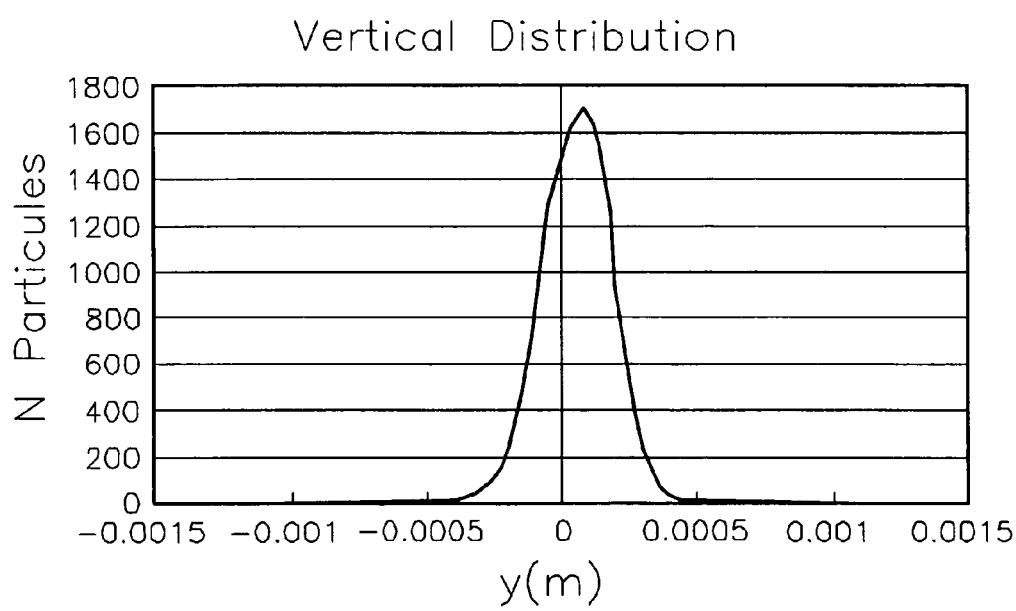
Figure 7C:
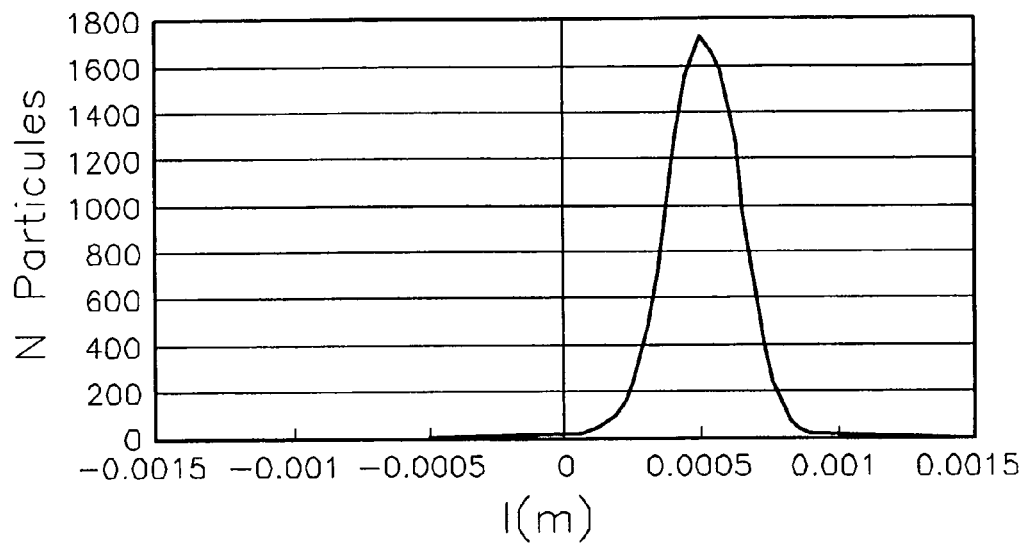
Figure 7D:
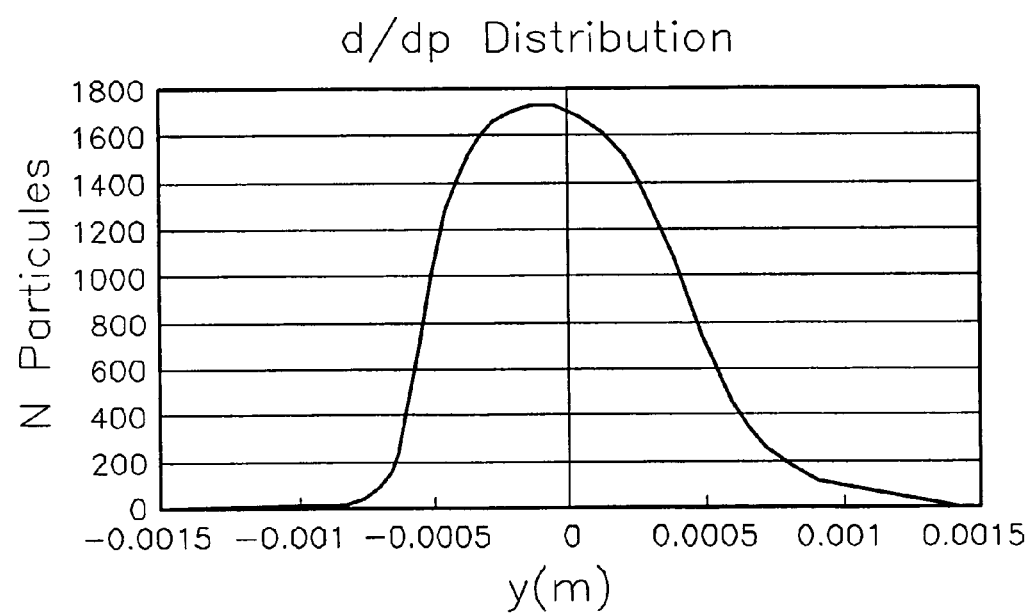

Using trims of this type, a 1.35 nC bunch can be compressed to ~400 fsec rms with only modest emittance degradation and with more or less reasonable aberration control. FIGS. 6 (a-b) present results of a momentum scan; both the lattice functions and orbit are well controlled.

FIGS. 7 (a-c) present graphical data showing the distribution of particles after transport for the linac to the wiggler with CSR effects included in accordance with the successful practice of the present invention.

As will be apparent to the skilled artisan, a number of variations and modifications can be made to the system described above without departing from the spirit and scope of the present invention. All such modifications and changes are clearly contemplated as being within the scope of the invention as defined by the appended claims.

What is claimed is:

1. A method of controlling coherent synchrotron radiation degradation of beam quality when a bunched electron beam is compressed in the operation of a free electron laser including a beam transport system comprising:
    A) controlling the rate of compression;
    B) integrating compression with the remainder of the transport system all by means of dispersion modulation; and
    C) including a monotonically increasing compaction recirculation arc followed by a separate compression line with monotonically decreasing negative compaction to control coherent synchrotron radiation degradation of beam quality.

2. The method of claim 1 including:
    A) a 180° recirculation arc based on alternating gradient focusing cells;
    B) a compressor system; and
    C) a final dispersion suppressor employing dispersion imaging into a small final trim dipole.

3. The method of claim 2 wherein the alternating gradient focusing cells are of a six-period configuration.

4. The method of claim 3 wherein the alternating gradient focusing cells comprise six quads and six dipoles.

5. The method of claim 4 wherein quads are used for horizontally focusing and parallel-faced dipoles are used for vertical focusing.

6. The method of claim 2 wherein the compressor system is a staircase dispersion suppressor and the final dispersion suppressor is a modulo ¼-integer dispersion imaging system.

7. The method of claim 5 wherein the final dispersion suppressor includes
    a five-quad ¾-wavelength dispersion modulation section;
    a pair of triplets to match linac to arc; and
    a four-quad telescope matching arc-compressor to wiggler.

8. The method of claim 2 wherein a quad triplet is used to provide 180° of phase advance.

9. The method of claim 7 wherein the compressor is an asymmetric stairstep.

* * * * *